United States Patent [19]
Rensch

[11] Patent Number: 4,924,147
[45] Date of Patent: May 8, 1990

[54] HIGH-FREQUENCY FLUORESCENT MARINE LIGHT

[76] Inventor: Jürgen Rensch, Vogelsang 19, 5650 Solingen, Fed. Rep. of Germany

[21] Appl. No.: 322,611

[22] Filed: Mar. 10, 1989

Related U.S. Application Data

[60] Division of Ser. No. 851,870, Apr. 11, 1986, which is a continuation of Ser. No. 535,358, Sep. 23, 1983.

[30] Foreign Application Priority Data

Sep. 24, 1982 [DE] Fed. Rep. of Germany ....... 3235381
Jan. 18, 1983 [DE] Fed. Rep. of Germany ....... 3301395

[51] Int. Cl.$^5$ ................................................ H01J 7/44
[52] U.S. Cl. ........................................ 315/58; 313/110; 313/114; 362/222
[58] Field of Search .................. 315/58; 313/110, 114; 362/222

[56] References Cited

U.S. PATENT DOCUMENTS

| 605,026 | 5/1898 | DeSpruner-Mertz | 313/114 |
| 3,737,651 | 6/1973 | Shute | 362/222 |
| 3,900,725 | 8/1975 | Komon | 362/222 |

FOREIGN PATENT DOCUMENTS 0861122 2/1961 United Kingdom ................ 313/114

Primary Examiner—Eugene R. LaRoche
Assistant Examiner—Truc Nguyen
Attorney, Agent, or Firm—Herbert Dubno

[57] ABSTRACT

An indicator lamp has a U-shaped fluorescent bulb having a pair of generally parallel legs and a driving circuit connected to the bulb for energizing same with an alternating-current voltage of a frequency greater than 40 kHz. When the driving frequency lies above 50 kHz and below 100 kHz, preferably between 80 kHz and 90 kHz, it has been found that the generation of spurious radio-frequency signals drops enormously, and in fact the system can normally be turned to generate no r-f interference at all. The driving circuit has an oscillator having a transistor, a trigger having an adjustable transformer and a transistor-controlled help stage connected to the transistor, and an electronic time-constant circuit connected to the trigger. The time-constant circuit includes a resistor and capacitor. The transformer has a primary connected to the oscillator and a secondary connected through the trigger to the bulb. This trigger has a resonance circuit connected to the transformer secondary.

12 Claims, 3 Drawing Sheets

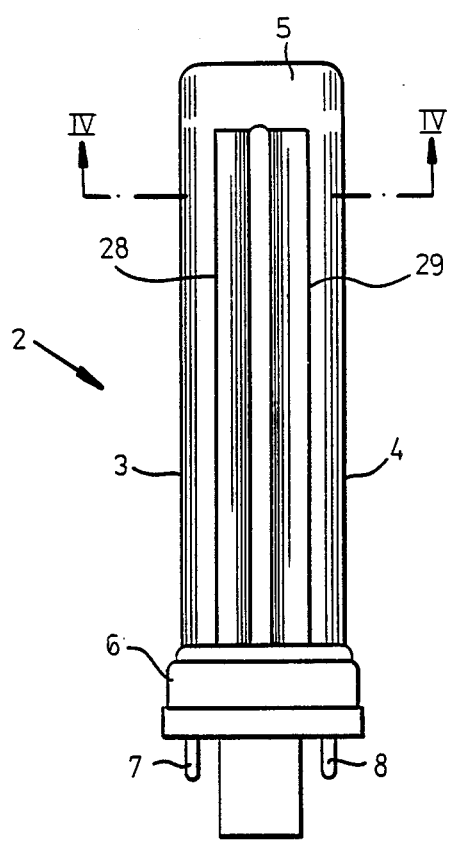
FIG.3
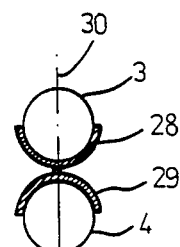
FIG.4
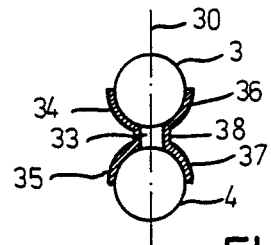
FIG.5
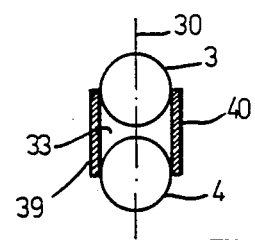
FIG.6
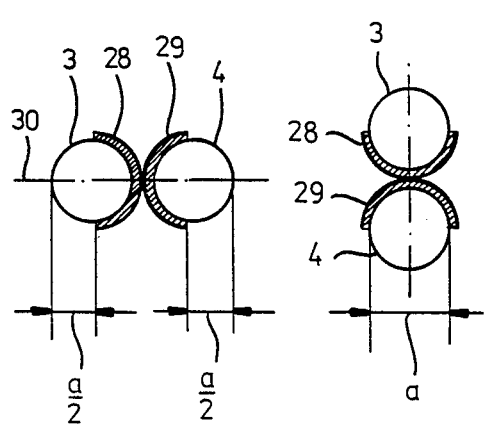
FIG.7
FIG.8
FIG.9

HIGH-FREQUENCY FLUORESCENT MARINE LIGHT

This is a divisonal of co-pending application Ser. No. 851,870 filed on 11 Apr. 1986 which is a continuation of Ser. No. 535,358 filed 23 Sept. 1983.

FIELD OF THE INVENTION

The present invention relates to a signal or indicator lamp. More particularly this invention concerns such a lamp used on a boat.

BACKGROUND OF THE INVENTION

Indicator or signal lamps have traditionally been built around standard resistance-type incandescent bulbs. Unfortunately such bulbs are relatively inefficient, consuming considerable electrical energy while producing limited actual light. In fact the principal output of such lamps is heat.

It is known to use fluorescent bulbs, which are many times more efficient than incandescent ones, for general lighting purposes on a boat. Such lamps require alternating-current energization, and, since it is necessary to convert the on-board direct-current voltage anyhow, it has been found that conversion to high frequencies causes the bulbs to work even more efficiently than they do with standard 50 Hz or 60 Hz energization. Tests have shown that the amount of light emitted for a given current consumption increases up to about 35 kHz, and then remains the same. Thus it is known to provide a converter circuit right in the lamp that converts the standard 24-volt direct current on-board power to high-frequency alternating current.

Use of such fluorescent fixtures as indicator lamps has been ruled out because their bulbs generate considerable radio-frequency interference, right up into the megaHerz range. In fact when the light output of such lamps is being boosted by increasing the frequency of the driving voltage, the output of r-f interference increases greatly, so that starting at a certain level it effectively becomes impossible to comply with mandated levels of r-f interference suppression.

Another disadvantage of fluorescent lamps for marine use is that they do not have the desired visibility curve. A navigational light, such as a masthead light, should be plainly visible from in front of itself over an arc of 215°, with approximately equal brilliance over this range, and in the next 10° should drop from visibility. A fluorescent lamp is normally of such structure that it constitutes several light sources, rather than what is effectively a point source created by the small filament of an incandescent bulb, and does not have the desired visibility-falloff characteristic.

OBJECTS OF THE INVENTION

It is therefore an object of the present invention to provide an improved indicator lamp for use on a watercraft.

Another object is the provision of such an indicator lamp for use on a watercraft which overcomes the above-given disadvantages, that is which is highly efficient while generating little appreciable r-f interference.

A further object is to make it possible to use high-efficiency fluorescent purposes for signal, navigational, and indicating lamps intended for marine use, without incurring a r-f interference problem.

SUMMARY OF THE INVENTION

An indicator lamp according to this invention has a U-shaped fluorescent bulb having a pair of generally parallel legs and a driving circuit connected to the bulb for energizing same with an alternating-current voltage of a frequency greater than 40 kHz.

Such U-shaped lamps are known in compact plug-in format, having at the free ends of their two U-legs a socket provided usually with four connecting pins. They are common in the 7 watt and 11 watt sizes.

When the driving frequency lies above 50 kHz and below 100 kHz, preferably between 80 kHz, it has been found that the generation of spurious radio-frequency signals drops enormously, and in fact the system can normally be tuned to generate no r-f interference at all.

This effect is apparently ascribable to the interaction of the standing wave emanating from one U-leg of the lamp with respect to the other. Thus the wave generated largely cancels itself out. Within the frequency range according to this invention it is relatively easy to find a level where the generation of r-f interference drops to nothing.

The driving circuit according to this invention has an oscillator having a transistor, a trigger having an adjustable transformer and a transistor-controlled help stage connected to the transistor, and an electronic time-constant circuit connected to the trigger. The time-constant circuit includes a resistor and capacitor. The transformer has a primary connected to the oscillator and a secondary connected through the trigger to the bulb. This trigger has a resonance circuit connected to the transformer secondary.

More particularly according to this invention, the trigger includes a transistor having a collector connected with the transistor of the oscillator, whose base is connected with the time-constant circuit, and whose emitter is connected via diodes with its base and with the base of the oscillator transistor. The driving circuit is powered by low direct-current voltage, normally 12 volts to 24 volts of direct current.

To provide the constant brightness as seen from any angle that is required for marine navigational lights, the light of this invention has respective shields provided between the bulb legs and covering that half of each leg turned toward the other leg. These shields extend generally the full length of the respective legs.

When the bulb legs are generally cylindrical, the shields are generally semicylindrical and concave away from each other. These shields can also be formed by two longitudinally extending strips each forming half of each shield. The strips in turn can be flat and generally planar, extending parallel to each other and flanking the bulb symmetry plane, or they can each have longitudinally extending curved edge regions that embrace the respective legs. The shields are opaque.

Due to the high efficiency of a U-shaped fluorescent bulb, shield half of its light still allows it to operate more efficiently than a standard incandescent bulb.

DESCRIPTION OF THE DRAWING

The above and other features and advantages will become more readily apparent from the following, reference being made to the accompanying drawing in which:

FIG. 3 is a side view of the bulb of the light of FIG. 1;

FIG. 4 is a cross section taken along IV—IV of FIG. 3;

FIGS. 5 and 6 are sections like FIG. 4 of alternative arrangements according to this invention; and FIGS. 7, 8, and 9 are views like FIG. 4 but showing the bulb of FIG. 3 as seen from the side, head-on, and from an angle, respectively.

SPECIFIC DESCRIPTION

Figure 1:
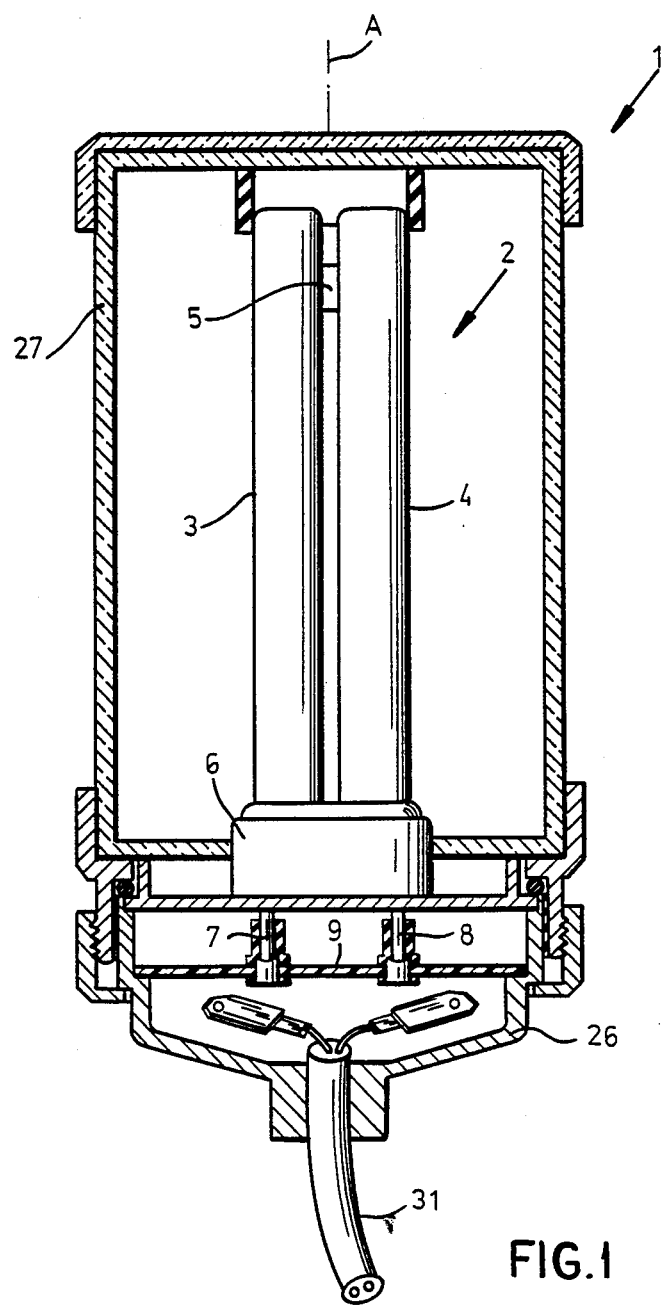
FIG. 1 is an axial section through the marine light according to this invention.

As seen in FIG. 1 the lamp according to this invention has a housing 1 formed of a base 26 and lens 27 defining a central axis A. The housing 1 supports a downwardly U-shaped fluorescent bulb 2 having a pair of axially extending legs 3 and 4 flanking the axis A and joined at their outer upper ends at a bight or joint section 5. The lower inner ends of the legs 3 and 4 of the bulb 2 are free and fit in a socket 6 to connect with pins 7, 8, 23, and 24 (the latter two shown in FIG. 2 only). The bulb 2 is plugged into a printed circuit 9 that is fed standard 24V direct-current ship electricity via a cable 31 from a battery 25 shown in FIG. 2.

Figure 2:
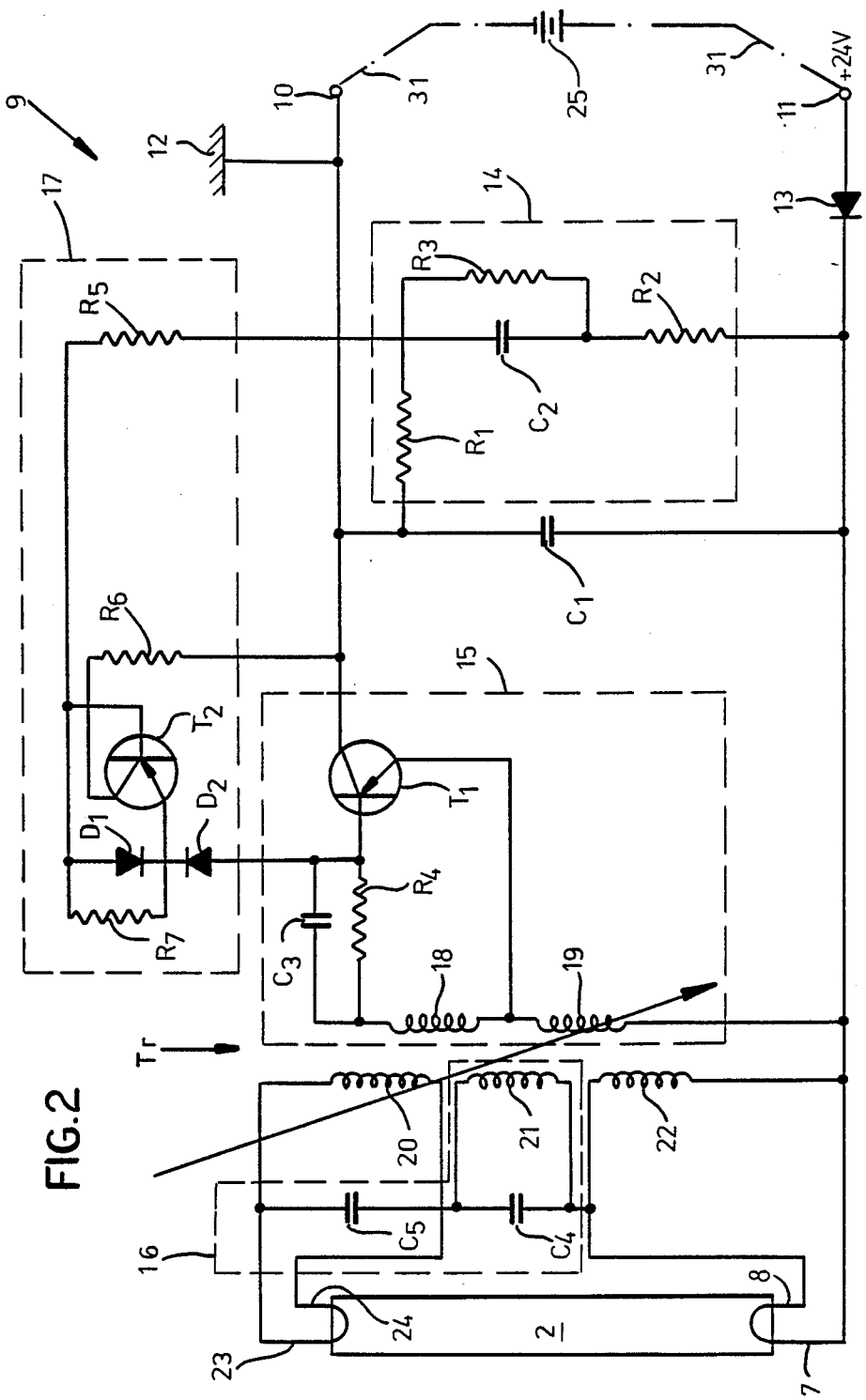
FIG. 2 is a circuit diagram of the driving unit of the light of FIG. 1.

The power-supply or driving circuit 9 shown in FIG. 2 has a negative terminal 10 and a possitive terminal 11, the latter connected to +24v and the former to the ground 12. An isolating diode 13 that prevents the device from being damaged by reversed polarity is connected to the positive terminal 11 also. A capacitor $C_1$ is connected across the terminals 10 and 11 after the isolation diode 13.

The tuned circuit 14 is a standard RC network having a capacitor $C_2$ in series with a resistor $R_2$ and in parallel with a discharging resistor $r_3$, and a charging or load resistor $R_1$ connected to ground. This tuned circuit 14 is coupled out via a base-protecting resistor $r_5$ to the stage 17.

The generator or oscillator 15 has a PNP transistor $T_1$ whose collector is connected to the ground 12, whose emitter is connected to the centertap of two primary windings 18 and 19 of a transformer Tr, and whose base is connected through a parallel capacitor $C_3$ and resistor $R_4$ to the other side of the primary winding 18, while the other side of the primary winding 19 is connected to the terminal 11. This transformer is of the E-E core type described in German patent document 3,130,049.

The trigger 16 includes the middle of three secondary windings 20, 21, and 22 of the transformer Tr. The ends of the one end winding 22 are connected to the terminals or pins 7 and 8 of the bulb 2 and this pin 7 is itself connected to the hot terminal 11. The other two terminals 23 and 24 of this bulb 2 (not illustrated in FIG. 1) are connected across the other end winding 20. The ends of the center winding 21 are connected together across a capacitor $C_4$ to resonate, while one side is directly connected to the pin 8 and the other side via a capacitor $C_5$ to the pin 23, so as to form a series resonance circuit whose frequency is in part determined by the inductance of the transformer Tr.

The pulse stage 17 has a PNP transistor $T_2$ whose base is connected via the resistor $R_5$ to the tuned circuit 14 and via a parallel-connected diode $D_1$ and resistor $R_7$ to its emitter. Its collector is connected via the resistor $R_6$ with the ground 12. The emitter is connected also via a level-setting diode $D_2$ to the base of the transistor $T_1$ of the generator 15.

This circuit operates as follows:

When switched on, the stage 17 is activated by the tuned circuit 14 until it delivers the necessary starting current to the transistor $T_1$ to start the generator 15 oscillating. This generator 15 thus produces on the secondary side 20, 21, 22 of the transformer Tr the voltage necessary to illuminate the bulb 2. Once the tuned circuit 14 is charged, the stage 17 cuts the current to the drive current, which is about 80% of the starting current.

The transformer Tr is adjustable. Before using the indicator lamp the circuit 9 tuned by means of this transformer Tr to an operational frequency above 40 kHz. This level is set in accordance with the radio emissions of the bulb 2, the adjustment of course being aimed at minimizing the generation of r-f interference. As mentioned above, each bulb 2 has a particular frequency at which its radio emissions are very small or nonexistent. With a standard 24-volt, small-format 7-watt fluorescent bulb of standard design this frequency lies between 80 Hz and 90 Hz.

The bulb 2 shown in FIGS. 3, 4, and 7 through 9 is provided with a pair of semicylindrical shields 28 that snugly fit around the inner halves of the two legs 3 and 4, bisected by the symmetry plane 30 of the bulb 2 and coaxial with the respective legs 3 and 4. This style of shielding causes the bulb to always appear to emit the same amount of light, which is directly proportional to the exposed bulb surface.

More particularly, as seen in FIG. 7, when the system is seen from the side half of the bulb diameter a is seen from each leg 3 and 4. When seen head-on, as shown in FIG. 8, all of the bulb diameter a of one leg 4 is seen and the other leg 3 is wholly out of view. FIG. 9 shows how when seen at an angle a major portion $a_1$ is seen of the leg 4 and a complementary minor portion $a_2$ of the leg 3, the two portions $a_1$ and $a_2$ adding up the the same dimension a. Thus at any angle the bulb 2 will appear to emit a steady light.

This effect can also be achieved by providing a pair of shields 34, 35 and 36, 37 that are secured together at their webs 38 at a point 33 between the two legs 3. Thus the leg 3 is embraced between the two quarter-cylindrical portions 34 and 36 and the leg 4 is embraced between the corresponding portions 35 and 37. The effect is the same as using two semicylindrical shields 28 and 29, but assembly is somewhat easier.

Similarly in FIG. 6 two flat shields 39 and 40 joined at 33 between the legs 3 and 4 are used. The edges of these flat shields 39 and 40 come to diametrically opposite lines on the legs 3 and 4, exactly covering half of each leg 3 and 4. No matter what the exact shielding style, what is important is that the two identical legs 3 and 4 are each covered on their half turned toward the other leg. With cylindrical legs 3 and 4 this means the semicylinders are shielded lying within two planes perpendicular to the symmetry plane 30 and including the axes of the respective bulb legs 3 and 4.

The shields are normally opaque. It is possible to make them limitedly, transparent, thereby increasing the overall light output of the system slightly.

With the arrangement of this invention it is therefore possible for a navigational light to use a highly efficient fluorescent bulb, thereby greatly redcing the operating cost of the unit while benefiting from the normally long service life of such a fixture. The system of this invention generates no appreciable radio-frequency interference, so its use on board ship will not interfere with radio or radar equipment.

Since the light is more efficient, it operates much more coolly, requiring therefore a substantially less massive housing than is necessary for an incandescent fixture. In addition due to the heavy ultraviolet component of the light emitted by a standard fluorescent bulb, visibility of it is excellent even at dusk.

I claim:

1. An indicator lamp comprising:
   a U-shaped fluorescent bulb having a pair of generally parallel legs;
   a driving circuit connected to said bulb for energizing same with an alternating-current voltage of a frequency greater than 40 kHz; and
   respective opaque shields provided between the bulb legs and each snugly fitting over said legs to cover a half of a respective one of said legs turned toward the other leg thereby preventing light transmission through said legs in areas covered by said shields.

2. The indicator lamp defined in claim 1 wherein said shields extend generally the full lengths of the respective ones of said legs.

3. The indicator lamp defined in claim 2 wherein said legs are generally cylindrical and said shields are generally semicylindrical and concave away from one another.

4. The indicator lamp defined in claim 2 wherein said shields are formed by two longitudinally extending strips each forming half of a respective shield.

5. The indicator lamp defined in claim 4 wherein said strips are generally planar.

6. The indicator lamp defined in claim 4 wherein said strips each have longitudinally extending curved edge regions that embrace the respective legs.

7. A signal light for a watercraft, comprising:
   a housing having a translucent lens surrounding an axis, and a base extending transversely to said axis and formed with an opening along said axis;
   a U-shaped fluorescent lamp having a pair of generally parallel legs plugged into said base at only one end of said lamp, said legs extending parallel to said axis;
   means in said base for energizing said lamp; and
   respective opaque shields provided between the bulb legs and each snugly fitting over said legs to cover a half of a respective one of said legs turned toward the other leg thereby preventing light transmission through said legs in areas covered by said shield.

8. The signal light defined in claim 7 wherein said shields extend generally the full lengths of the respective ones of said legs.

9. The signal light defined in claim 8 wherein said legs are generally cylindrical and said shields are generally semicylindrical and concave away from one another.

10. The signal light defined in claim 8 wherein said shields are formed by two longitudinally extending strips each forming half of a respective shield.

11. The signal light defined in claim 10 wherein said strips are generally planar.

12. The signal light defined in claim 10 wherein said strips each have longitudinally extending curved edge regions that embrace the respective legs.

* * * * *